(12) United States Patent
Doelle et al.

(10) Patent No.: US 7,567,663 B2
(45) Date of Patent: Jul. 28, 2009

(54) TELEPHONE CALL PROCESSING

(75) Inventors: Michael Doelle, Munich (DE); Thomas Hasenfratz, Lindau (DE)

(73) Assignee: Siemens Aktiengesellschaft, Munich (DE)

( * ) Notice: Subject to any disclaimer, the term of this patent is extended or adjusted under 35 U.S.C. 154(b) by 908 days.

(21) Appl. No.: 10/953,076

(22) Filed: Sep. 30, 2004

(65) Prior Publication Data

US 2005/0123119 A1     Jun. 9, 2005

(30) Foreign Application Priority Data

Oct. 1, 2003     (GB)     ................... 0322973.9

(51) Int. Cl.
*H04M 3/42*     (2006.01)
(52) U.S. Cl. ..................... 379/211.01; 379/211.02; 379/212.01
(58) Field of Classification Search ........... 379/211, 379/112, 201, 221, 211.01, 211.02, 212.01
See application file for complete search history.

(56) References Cited

U.S. PATENT DOCUMENTS 5,592,541 A     1/1997     Fleischer, III et al.
6,320,947 B1 *  11/2001    Joyce et al. ............... 379/114.2
6,463,145 B1 *  10/2002    O'Neal et al. ........... 379/211.02
6,611,682 B1     8/2003     Pröjtz
2005/0117731 A1 *  6/2005    Pearson ................. 379/211.02

FOREIGN PATENT DOCUMENTS

| EP | 1 087 599 A2 | 3/2001 |
|---|---|---|
| EP | 1 100 248 A2 | 5/2001 |
| GB | 2338867 A | 12/1999 |
| GB | 2349307 A | 10/2000 |
| WO | WO 98/41043 A1 | 9/1998 |
| WO | WO00/59194 A1 | 10/2000 |

* cited by examiner

*Primary Examiner*—Curtis Kuntz
*Assistant Examiner*—Amal Zenati
(74) *Attorney, Agent, or Firm*—Crowell & Moring LLP

(57) ABSTRACT

A telephone call processing method comprising the steps of: (i) receiving a telephone call for transfer to a first telephone number; (ii) determining whether the first telephone number has been set to divert calls to a second telephone number; and (iii) processing the call in dependence upon the determination of step (ii).

12 Claims, 2 Drawing Sheets

TELEPHONE CALL PROCESSING

Figure 1:
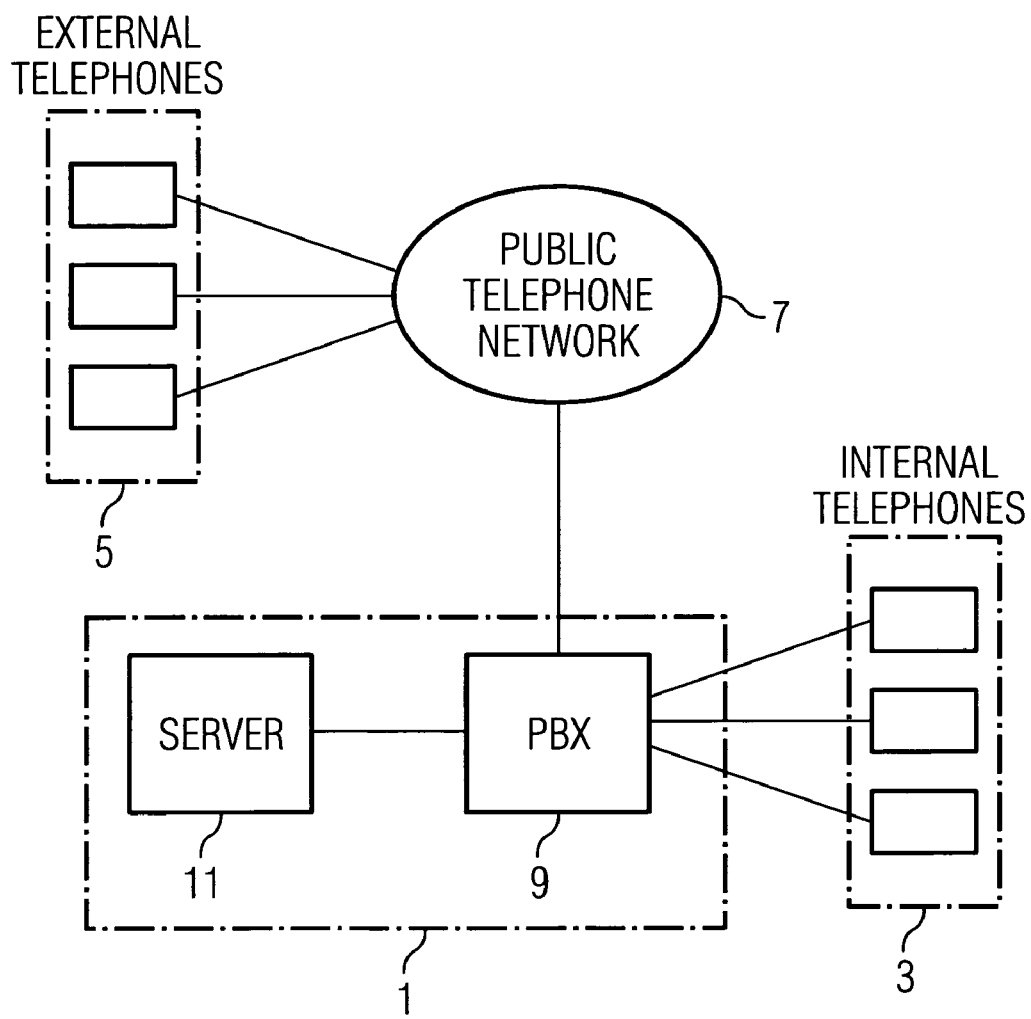

This invention relates to telephone call processing.

More particularly, the invention relates to telephone call processing wherein a telephone call is received for transfer to a first telephone number.

As will now be explained, a problem may arise in the case where the first telephone number is set to divert calls to a second telephone number.

It is known to automatically and intelligently process telephone calls using a server. A server might respond to an incoming call by presenting to the caller a list of options selectable by the caller, e.g. by means of the caller's telephone key-pad. In the discussion to follow it is assumed that the list of options includes the option to be transferred to a first telephone number, and that the caller selects this option.

In the case where the first number is not set to divert calls to a second number, there are a number of possible outcomes as follows: (a) the first number answers—a favourable outcome; (b) the first number does not answer—following timeout, control of call transfer reverts to the server—the server is thus able to suggest alternative call destinations—this is a favourable outcome as the call is not lost, and the server remains in control and is able to make intelligent suggestions as to alternative call destinations; and (c) the first number is busy—control of call transfer immediately reverts to the server—the server is thus able to suggest alternative call destinations—again, a favourable outcome.

In the case where the first number is set to divert calls to a second number, matters become more complicated. Possible outcomes are as follows: (a) the second number is of assistance to the caller—a favourable outcome; (b) the second number is not of assistance to the caller—the call must now be forwarded by hand, or alternatively the caller must begin the call again—not a favourable outcome; (c) the second number does not answer—the period to timeout may be lengthy—the caller may not wait for this period of time—not a favourable outcome; (d) the second number is a mobile phone—the person who answers may not be able to assist due to his/her location—not a favourable outcome; (e) the second number may itself be call-diverted, and so on—the maximum number of possible diversions may be exceeded—the call is lost—not a favourable outcome; and (f) following a series of diversions, the caller is returned to the server, and the caller is presented again with the initial list of options—not a favourable outcome.

It is an object of the present invention to substantially reduce the number of unfavourable outcomes in the case where a telephone call is received for transfer to a first number, and the first number is set to divert calls to a second number.

According to a first aspect of the present invention there is provided a telephone call processing method comprising the steps of: (i) receiving a telephone call for transfer to a first telephone number; (ii) determining whether the first telephone number has been set to divert calls to a second telephone number; and (iii) processing the call in dependence upon the determination of step (ii).

According to a second aspect of the present invention there is provided a telephone call processing system arranged to: (i) receive a telephone call for transfer to a first telephone number; (ii) determine whether the first telephone number has been set to divert calls to a second telephone number; and (iii) process the call in dependence upon the determination of step (ii).

Figure 2:
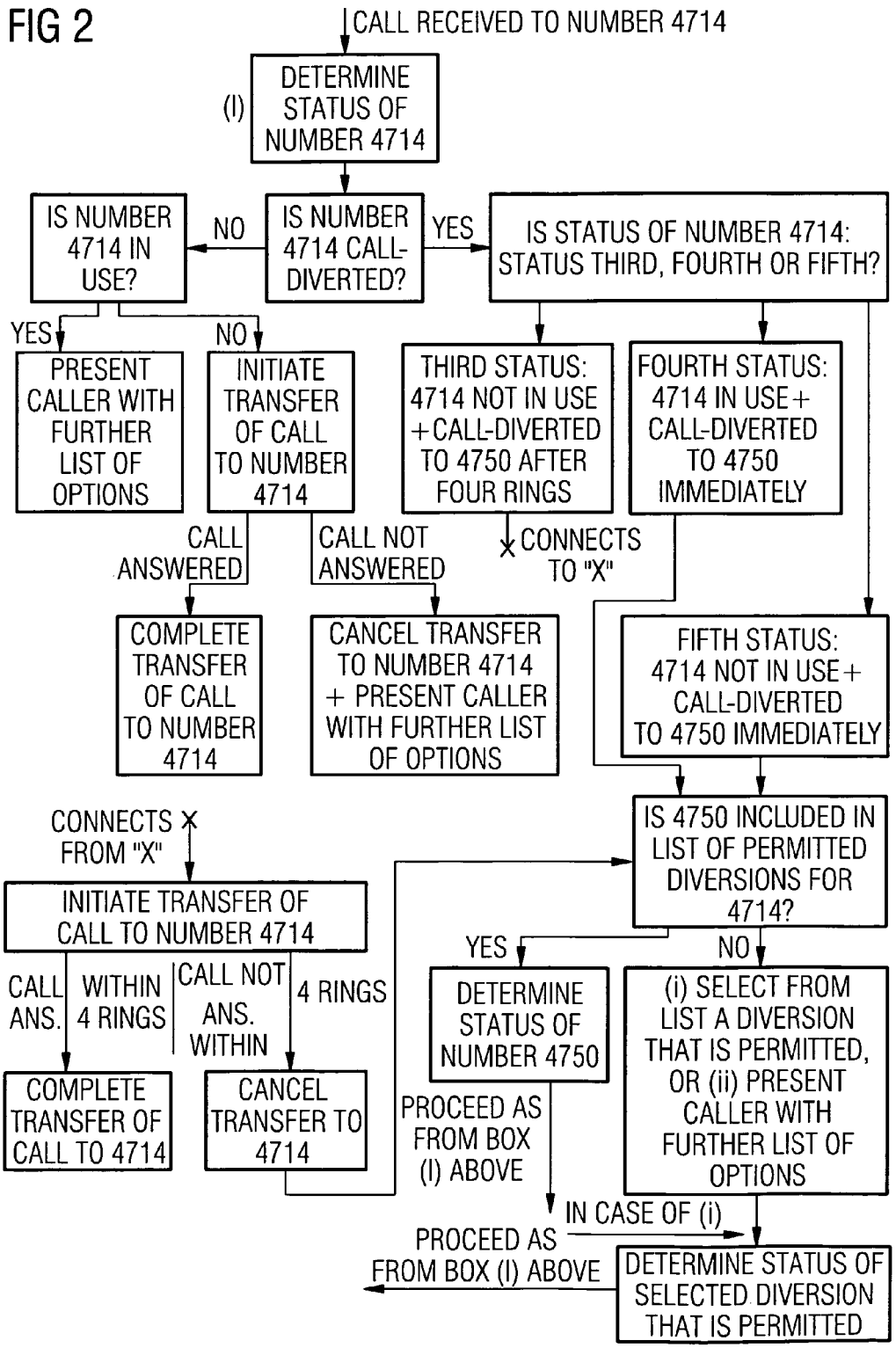

The invention will now be described, by way of example, with reference to the accompanying drawings, in which:

FIG. 1 is a block schematic diagram of a telephone network including a telephone call processing system in accordance with the present invention; and FIG. 2 is a flow chart illustrating operation of the call processing system of FIG. 1.

Referring to FIG. 1, the telephone network comprises: a telephone call processing system 1; internal telephones 3, calls to which are processed by telephone call processing system 1; external telephones 5 for making calls to internal telephones 3; and a public telephone network 7 by which external telephones 5 are connected to telephone call processing system 1. Telephone call processing system 1 comprises a private branch exchange (PBX) 9, and a server 11 connected to PBX 9. PBX 9 is also connected to public telephone network 7 and internal phones 3.

Referring to FIGS. 1 and 2, a call made by an external telephone 5 to an internal telephone 3 is processed as follows.

The call is routed by public telephone network 7 and PBX 9 to server 11. Server 11 responds by presenting a list of options to the caller. The caller selects the desired option, e.g. by means of the key-pad of external telephone 5. The desired option might be for example to be transferred to a customer service department having telephone number 4714.

Taking the example of telephone number 4714, server 11 responds to this selection by instructing PBX 9 to determine the status of the internal telephone 3 having number 4714. The status comprises: (i) whether the telephone at number 4714 is in use; (ii) whether the telephone at number 4714 has been set to divert received calls to another telephone number; (iii) if number 4714 has been set to divert calls, the other number to which the calls are diverted; and (iv) if number 4714 has been set to divert calls, whether the diversion is immediate (is set to take place without condition) or time-dependent (is set to take place only if number 4714 does not answer after a predetermined number of rings).

A first possible status of telephone number 4714 comprises: (i) the number is not in use; and (ii) the number has not been set to divert received calls to another number.

In the case of this status, server 11 proceeds to instruct PBX 9 to initiate transfer of the call to number 4714. Server 11 does not relinquish control over the call, and continues to monitor the call. In the event that number 4714 answers the call, server 11 instructs PBX 9 to complete transfer of the call to number 4714. In the event that number 4714 does not answer the call, server 11 cancels transfer of the call to number 4714, and presents the caller with a further list of options, which could include for example being diverted to the mail box for number 4714.

A second possible status of telephone number 4714 comprises: (i) the number is in use; and (ii) the number has not been set to divert received calls to another number.

In the case of this status, server 11 presents the caller with a further list of options.

A third possible status of telephone number 4714 comprises: (i) the number is not in use; (ii) the number has been set to divert received calls to another number; (iii) this other number is 4750; and (iv) the diversion is time-dependent and is set to take place after four rings.

In the case of this status, server 11 proceeds to instruct PBX 9 to initiate transfer of the call to number 4714. Server 11 does not relinquish control over the call, and continues to monitor the call. In the event that number 4714 answers the call within four rings, server 11 completes transfer of the call to number 4714. In the event that number 4714 does not answer within four rings, server 11 cancels transfer of the call to number 4714, and determines whether number 4750 to which calls are diverted is included in a list held by server 11 of permitted diversions from number 4714.

If number 4750 is included, then, as before in respect of number 4714, server 11 instructs PBX 9 to determine the status of number 4750. It will be assumed that number 4750 is not in use and is not call-diverted, i.e. is in the first possible status as given above. The processing of the call then proceeds in the same manner as given above in respect of the first possible status.

If number 4750 is not included in the list of permitted diversions from number 4714, server 11 either: (i) selects from the list a diversion that is permitted, and instructs PBX 9 to determine the status of this number; or (ii) presents the caller with a further list of options. As regards (i), it will be assumed that the selected number is not in use and is not call-diverted. The processing of the call then proceeds in the same manner as in respect of the first possible status.

A fourth possible status of telephone number 4714 comprises: (i) the number is in use; (ii) the number has been set to divert received calls to another number; (iii) this other number is 4750; and (iv) the diversion is immediate (on account of the number being in use).

In the case of this status, server 11 determines whether number 4750 to which calls are diverted is included in the list held by server 11 of permitted diversions from number 4714. The processing of the call then proceeds in the same manner as given above in respect of the third possible status of number 4714, following determination of whether number 4750 is in the list of permitted diversions from number 4714.

A fifth possible status of telephone number 4714 comprises: (i) the number is not in use; (ii) the number has been set to divert received calls to another number; (iii) this other number is 4750; and (iv) the diversion is immediate.

In the case of this status, the processing of the call is the same as given above in respect of the fourth possible status of number 4714.

It will be appreciated from the above description by way of example, that every time server 11 encounters a new number to transfer to, it first determines the status of the new number, and then processes the received call in accordance with the determined status. In the above description by way of example, server 11 encounters a new number to transfer to in three different ways: (i) a new number selected by the caller; (ii) a new number to which calls to a telephone are set to be diverted; and (iii) a new number selected by server 11 from a list of permitted diversions for a telephone.

In the telephone call processing described above by way of example, when it becomes apparent to the server that call diversion from a first to a second telephone number is imminently to occur, the server checks whether the second number is a permitted diversion from the first. It is to be appreciated that the server may not make this check, but may simply entirely avoid the set call diversion by selecting its own alternative number to the first number (which alternative number may of course happen to be the same as the set diversion number), or by presenting the caller with a further list of options. In this case, of course, the server does not require to know the actual telephone number to which calls are set to be diverted.

In the telephone call processing described above by way of example, the server initially responds to the caller by presenting a list of options, and the caller then selects the option to be transferred to a first telephone number. It is to be appreciated that the initial call by the caller may be to the first telephone number, and that this call would be received by the server as an immediate request to be transferred to the first number. In this case of course the server would not respond by presenting a list of options, but would immediately proceed to the step where it requests the PBX to determine the status of the first number.

It is to be noted that in the above described telephone call processing, the server learns of any call diversion (also termed call forwarding) that may occur before it actually does occur in terms of control of call processing by the server, i.e. before it actually becomes effective in terms of call processing by the server. In consequence, the server always retains control over queued calls, and is therefore able to minimise the number of calls directed to inappropriate call destinations or lost.

As is known in the art, there are so called B-channels (bearer or voice channels) and D-channels (signalling channels) between the server and the PBX. In the above described call processing, a call is received for transfer to a first number, and prior to transfer the server instructs the PBX to determine whether the first number is call-diverted. In terms of the use of B and D channels, this could be achieved in one of two ways.

The call to the server requesting transfer to the first number uses one B channel. The instruction by the server to the PBX to determine whether the first number is call-diverted can be made either by means of a second B channel or by using a D channel. In the case of the use of the second B channel, the reply of the PBX also occurs on this second B-channel—further, an instruction by the server to the PBX to transfer the call to the first number would also take place on the second B channel. In the case of the use of the D channel, the reply of the PBX also occurs on the D channel, and an instruction to transfer the call to the first number would also take place on the D channel.

Of the two methods, the method using a D channel is preferred as it uses one less B channel, and hence this unused B channel remains available for the receipt of a further telephone call to the server.

The invention claimed is:

1. A telephone call processing method comprising the steps of:

(i) receiving a telephone call for transfer to a first telephone number;

(ii) determining whether the first telephone number has been set to divert calls to a second telephone number; and (iii) processing the call based on a result of the determination of step (ii); wherein step (ii) also includes determining whether the first telephone number is in use and, if the first telephone number has been set to divert calls, the number of the second telephone; and determining whether the diversion is immediate or takes place only if the first number does not answer after a predetermined period;

when step (ii) determines that the first telephone number is not in use, that the first telephone number is diverted, and that the diversion only takes place after said predetermined period, step (iii) comprises the sub-steps of (a) monitoring the first number; (b) in the event that the first number does not answer within the predetermined period, determining whether the second telephone number is included in a list of permitted diversions from the first telephone number; and (c) processing the call in dependence upon the determination of sub-step (b);

when sub-step (b) determines that the second number is included in the list of permitted diversions from the first telephone number, sub-step (c) comprises initiating transfer of the call to the second telephone number; and, when sub-step (b) determines that the second telephone number is not included in the list of permitted diversions from the first telephone number, sub-step (c) comprises one of initiating transfer of the call to a number that is included in the list, and presenting the caller with a list of options selectable by the caller.

2. The method according to claim 1, wherein, when step (ii) determines that the first number is in use, that the first number is diverted, and that the diversion is immediate on account of the first number being in use, step (iii) comprises the sub-steps of (a) determining whether the second number is included in a list of permitted diversions from the first number, and (b) processing the call in dependence upon the determination of sub-step (a).

3. The method according to claim 1, wherein, when step (ii) determines that the first number is not in use, that the first number is diverted, and that the diversion is immediate, step (iii) comprises the sub-steps of (a) determining whether the second number is included in a list of permitted diversions from the first number, and (b) processing the call in dependence upon the determination of sub-step (a).

4. The method according to claim 2, wherein:
when sub-step (a) determines that the second number is included in the list of permitted diversions from the first number, sub-step (b) comprises initiating transfer of the call to the second number; and
when sub-step (a) determines that the second number is not included in the list of permitted diversions from the first number, sub-step (b) comprises one of initiating transfer of the call to a number that is included in the list, and presenting the caller with a list of options selectable by the caller.

5. The method according to claim 1, wherein step (i) comprises:
receiving a call and presenting to the caller a list of options selectable by the caller, said list of options including the option to be transferred to said first number; and
receiving the selection by the caller of the option to be transferred to the first number.

6. The method according to claim 1, wherein, when step (ii) determines that the first telephone number has been set to divert calls to a second telephone number, step (iii) comprises, when call diversion is imminent, either: (a) selecting an alternative number to the first number, which alternative number may or may not be said second number; or (b) presenting the caller with a list of options selectable by the caller.

7. A telephone call processing system arranged to (i) receive a telephone call for transfer to a first telephone number; (ii) determine whether the first telephone number has been set to divert calls to a second telephone number; and (iii) process the call based on a result of the determination of step (ii); wherein,
the determination (ii) includes determining whether the first telephone number is in use and, if the first telephone number has been set to divert calls, the number of the second telephone; and determining whether the diversion is immediate or takes place only if the first number does not answer after a predetermined period;
when it is determined in (ii) that the first telephone number is not in use, that the first telephone number is diverted, and that the diversion only takes place after said predetermined period, (iii) comprises the (a) monitoring the first number; (b) in the event that the first number does not answer within the predetermined period, determining whether the second telephone number is included in a list of permitted diversions from the first telephone number; and (c) processing the call in dependence upon the determination of (b);
when it is determined in (b) that the second number is included in the list of permitted diversions from the first telephone number, (c) comprises initiating transfer of the call to the second telephone number; and,
when it is determined in (b) that the second telephone number is not included in the list of permitted diversions from the first telephone number, (c) comprises one of initiating transfer of the call to a number that is included in the list, and presenting the caller with a list of options selectable by the caller.

8. The telephone call processing system according to claim 7, wherein when it is determined in (ii) that the first number is in use, that the first number is diverted, and that the diversion is immediate on account of the first number being in use, (iii) comprises (a) determining whether the second number is included in a list of permitted diversions from the first number, and (b) processing the call in dependence upon the determination of (a).

9. The telephone call processing system according to claim 7, wherein when it is determined in (ii) that the first number is not in use, that the first number is diverted, and that the diversion is immediate, (iii) comprises (a) determining whether the second number is included in a list of permitted diversions from the first number, and (b) processing the call in dependence upon the determination of (a).

10. The telephone call processing system according to claim 8, wherein when it is determined in (a) that the second number is included in the list of permitted diversions from the first number, (b) comprises initiating transfer of the call to the second number, and when (a) determines that the second number is not included in the list of permitted diversions from the first number, (b) comprises one of initiating transfer of the call to a number that is included in the list, and presenting the caller with a list of options selectable by the caller.

11. The telephone call process system according to claim 7, wherein (i) comprises:
receiving a call and presenting to the caller a list of options selectable by the caller, said list of options including the option to be transferred to said first number; and
receiving the selection by the caller of the option to be transferred to the first number.

12. The telephone call processing system according to claim 7, wherein when it is determined in (ii) that the first telephone number has been set to divert calls to a second telephone number, (iii) comprises, when call diversion is imminent, either: (a) selecting an alternative number to the first number, which alternative number may or may not be said second number; or (b) presenting the caller with a list of options selectable by the caller.

* * * * *